(12) United States Patent
Tien

(10) Patent No.: US 6,789,737 B2
(45) Date of Patent: Sep. 14, 2004

(54) LIGHT SOURCE MECHANISM OF BARCODE SCANNER

(75) Inventor: Kai-Yuan Tien, Changhua (TW)

(73) Assignee: Riotec Corp., Taipei (TW)

( * ) Notice: Subject to any disclaimer, the term of this patent is extended or adjusted under 35 U.S.C. 154(b) by 0 days.

(21) Appl. No.: 10/196,938

(22) Filed: Jul. 18, 2002

(65) Prior Publication Data

US 2003/0111537 A1 Jun. 19, 2003

(30) Foreign Application Priority Data

Dec. 19, 2001 (TW) ..................... 90222321 U
Apr. 29, 2002 (TW) ..................... 91205892 U

(51) Int. Cl.[7] ................................. G06K 7/10
(52) U.S. Cl. ............ 235/462.45; 235/454; 235/462.01; 235/462.22; 235/462.23; 235/462.35; 235/472.01; 359/205; 359/206; 359/244
(58) Field of Search ............ 235/454, 462.01, 235/462.46, 462.45, 472.01, 472.02, 462.22, 462.23, 462.35; 359/291, 226, 205, 206, 244

(56) References Cited

U.S. PATENT DOCUMENTS

| | | | |
|---|---|---|---|
| 5,010,241 A | * | 4/1991 | Butterworth ............ 235/462.24 |
| 5,192,856 A | * | 3/1993 | Schaham ................ 235/462.24 |
| 5,349,172 A | * | 9/1994 | Roustaei ................ 235/462.42 |
| 5,365,049 A | * | 11/1994 | Peng ..................... 235/462.22 |
| 5,979,767 A | * | 11/1999 | Schonenberg et al. . 235/462.35 |
| 6,062,476 A | * | 5/2000 | Stern et al. ............ 235/462.35 |
| 6,073,851 A | * | 6/2000 | Olmstead et al. ...... 235/462.45 |
| 6,191,882 B1 | * | 2/2001 | Gelbart ..................... 359/291 |
| 6,315,203 B1 | * | 11/2001 | Ikeda et al. ............ 235/462.23 |
| 6,527,180 B1 | * | 3/2003 | Dvorkis et al. ........ 235/462.01 |
| 6,550,942 B1 | * | 4/2003 | Zou et al. .................... 362/347 |

* cited by examiner

Primary Examiner—Thien M. Le
Assistant Examiner—Allyson N Trail
(74) Attorney, Agent, or Firm—Rabin & Berdo, P.C.

(57) ABSTRACT

A light source mechanism of a barcode scanner includes a laser diode as the point type light source, a collimating lens and a standing cylindrical lens in front of the laser diode. A mirror or a thin-film coating prism can be installed in front of the collimating lens to have the light beam from the collimating lens be reflected at least once to go out in horizontal direction. The reflected light beam from barcode passes through a condensing lens and is received by a linear receiver (CCD or CMOS sensor, for example) and is converted into electrical signals, and decoded by a circuit to get the data.

11 Claims, 12 Drawing Sheets

LIGHT SOURCE MECHANISM OF BARCODE SCANNER

BACKGROUND OF THE INVENTION

I. Field of the Invention

This invention relates generally to a light source mechanism of a barcode scanner and, more specifically, to a light source mechanism of a barcode scanner that has a standing cylindrical lens in front of the laser diode, and a point type light source is extended into a stripe type light beam. A mirror or a thin film coating prism is installed between the collimating lens and the standing cylindrical lens to make the light beam be reflected at least once and propagate horizontally, pass through the standing cylindrical lens, and finally form a horizontal stripe type light beam. This mechanism can save the cost of a circuit board, and at the same time can offer more internal enclosure space for another design.

II. Description of the Prior Art

Heretofore, it is known that the light source of the barcode scanner is a laser diode. The point type expanding light beam of the known laser diode passes through a collimating lens and is transferred into a point type parallel light beam and then reaches a target barcode by being reflected by a mirror. The mirror rotates with a definite angle or vibrates to have the light "point" move from left to right (or from right to left) on the target barcode to scan the barcode. The scanned image is reflected back to a "point type" receiver (photodiode sensor, for example) to be detected and decoded by the following electric components. The disadvantages of this design: a need to vibrate or rotate a mirror to send out the point type light source; the mirror might not be easy to adjust during the manufacturing process, and the mirror can be tilted or even disordered by collision.

The barcode scanner has a main circuit board located horizontally with a secondary circuit board standing vertically. A laser diode is soldered on the secondary circuit board to have the light beam inject horizontally. The light beam reaches to the barcode and is reflected back to a "point type" receiver (photodiode sensor, for example). During the manufacturing process, the two circuit boards must be assembled vertically to have the light beam eject out horizontally. The manufacturing cost is higher, and bad connections might occur between two circuit boards. Since the two vertically connected boards are inside the enclosure, the internal mechanical design is limited and can not be improved. With such limitations, it is difficult to have a special design on styling.

SUMMARY OF THE INVENTION

It is therefore a primary object of the invention to provide a light source mechanism of a barcode scanner to have light beam from laser diode as light source; goes through a collimating lens and a standing cylindrical lens (or multiple combination of different standing cylindrical lenses), the point type laser light source can become a stripe type light on the target barcode, the reflected light from barcode is focused by a condensing lens to a "linear" light receiver (CCD or CMOS sensor, for example), which can transfer the light signal into electrical signal, a circuitry on the backend can decode the electrical signal. The scheme has stronger light, farther projectile distance; projectile light is more focused and clear, thus easier for manufacturing and collision-resistant.

It is another object of this invention to provide a light source mechanism of a barcode scanner, a mirror or a prism is installed in front of the laser diode and the collimating lens that can change the direction of the laser beam to save the cost of another circuit board of the prior art. The prism of the present invention contains many inclined planes to change the direction of light beam; such scheme simplifies the assembly and offers more internal space for more variety of design.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
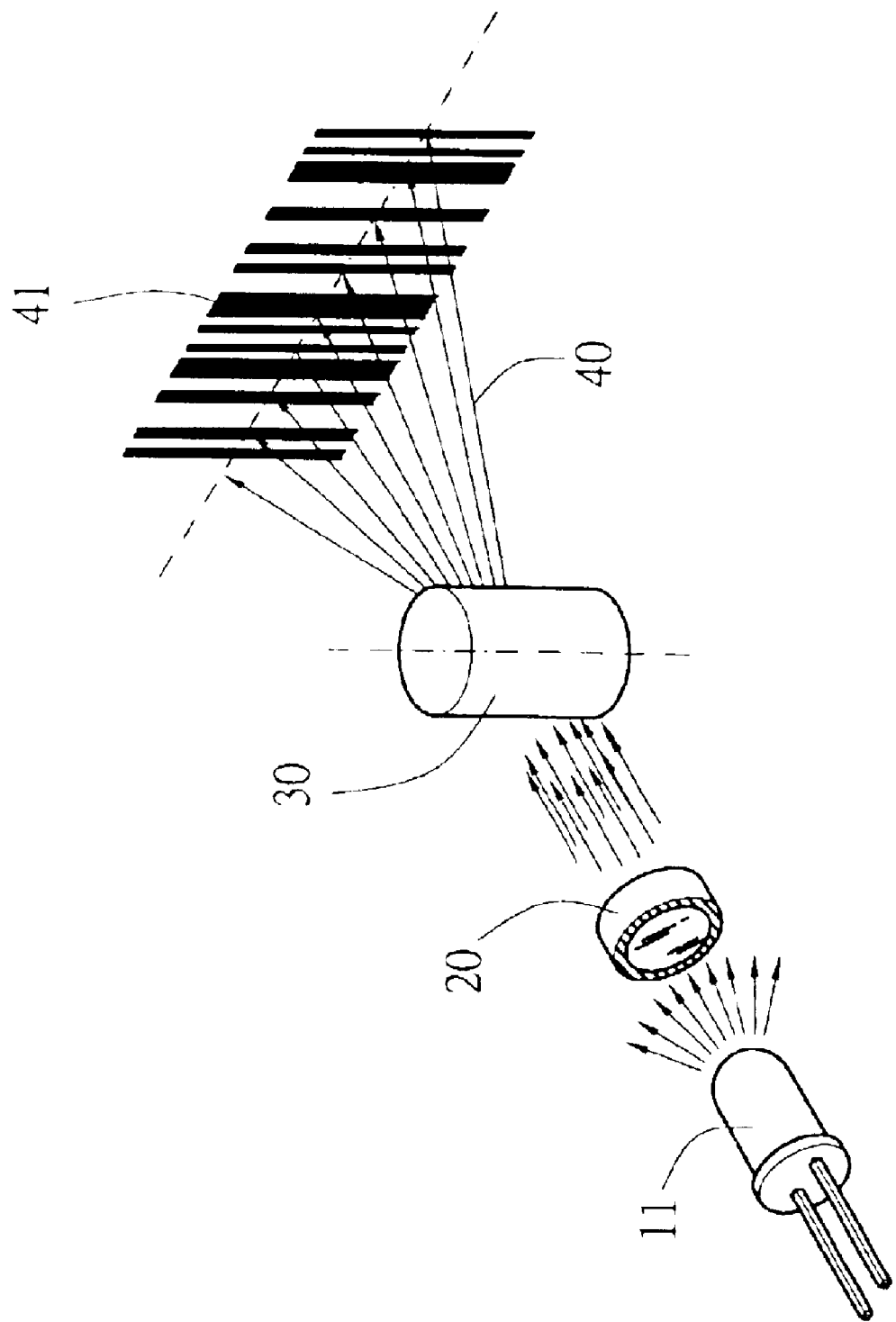
FIG. 1 is a perspective view of a laser diode light source of the present invention.
Figure 2A:
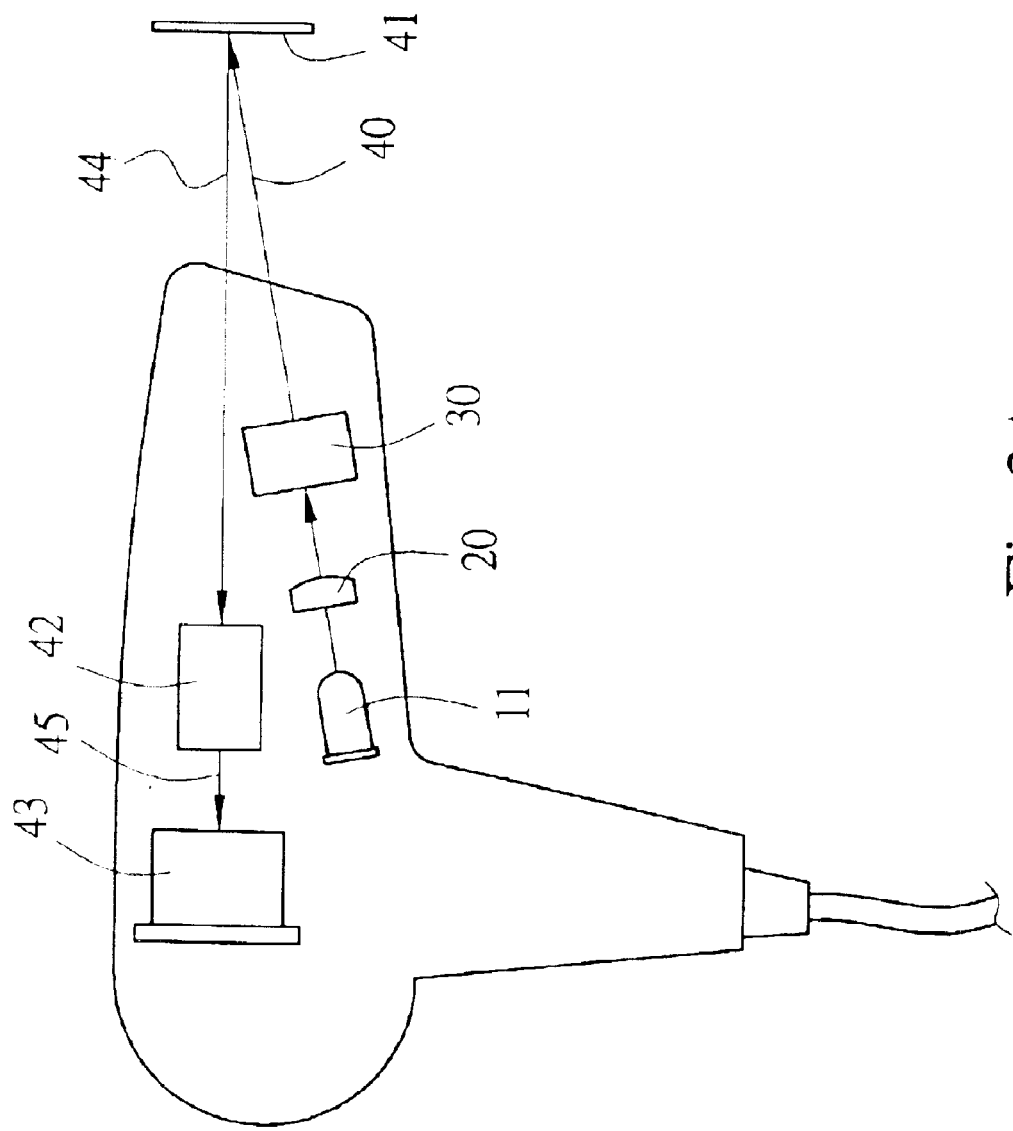
FIG. 2A is a schematic drawing of the present invention.
Figure 2B:
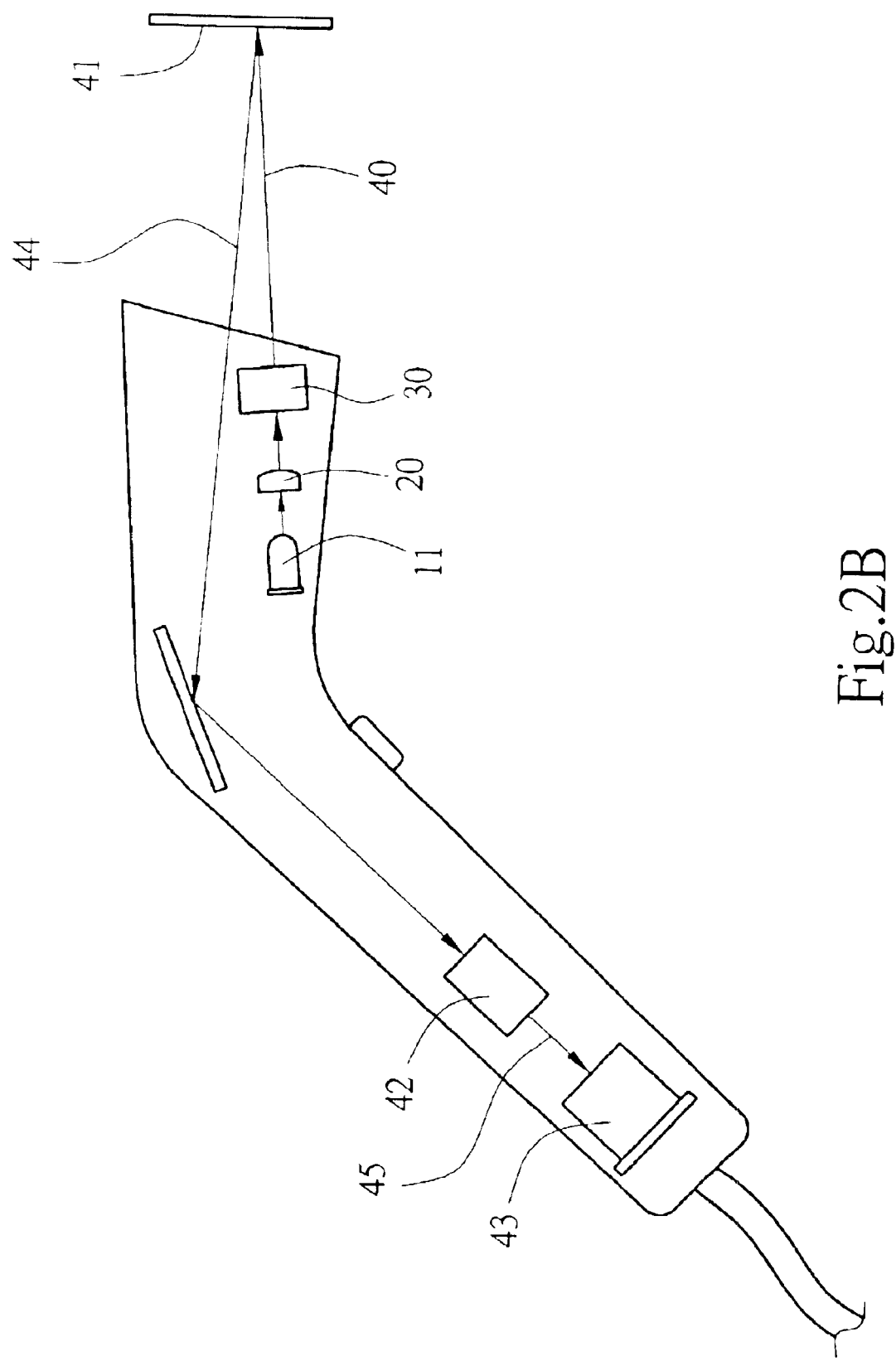
FIG. 2B is a schematic drawing of a further embodiment of the present invention.
Figure 3A:
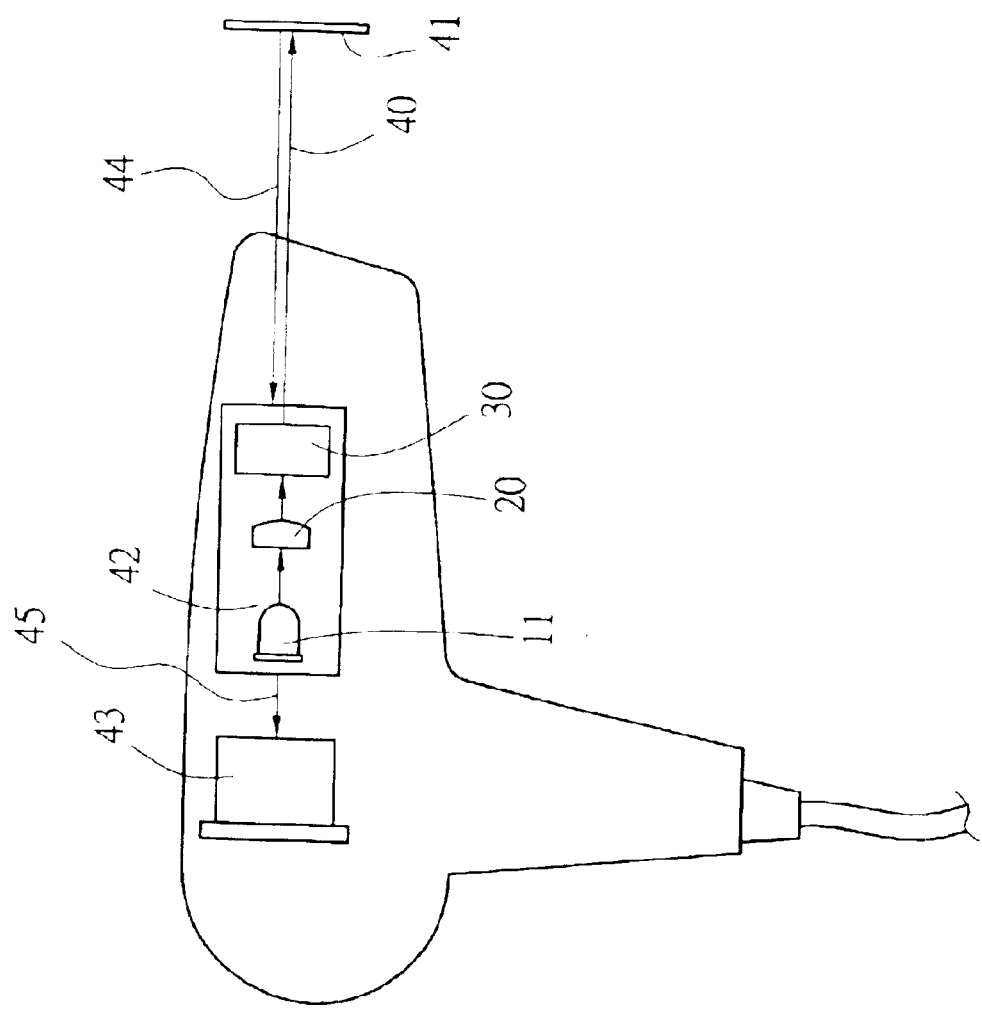
FIG. 3A is a schematic drawing of another embodiment view of the present invention.
Figure 3B:
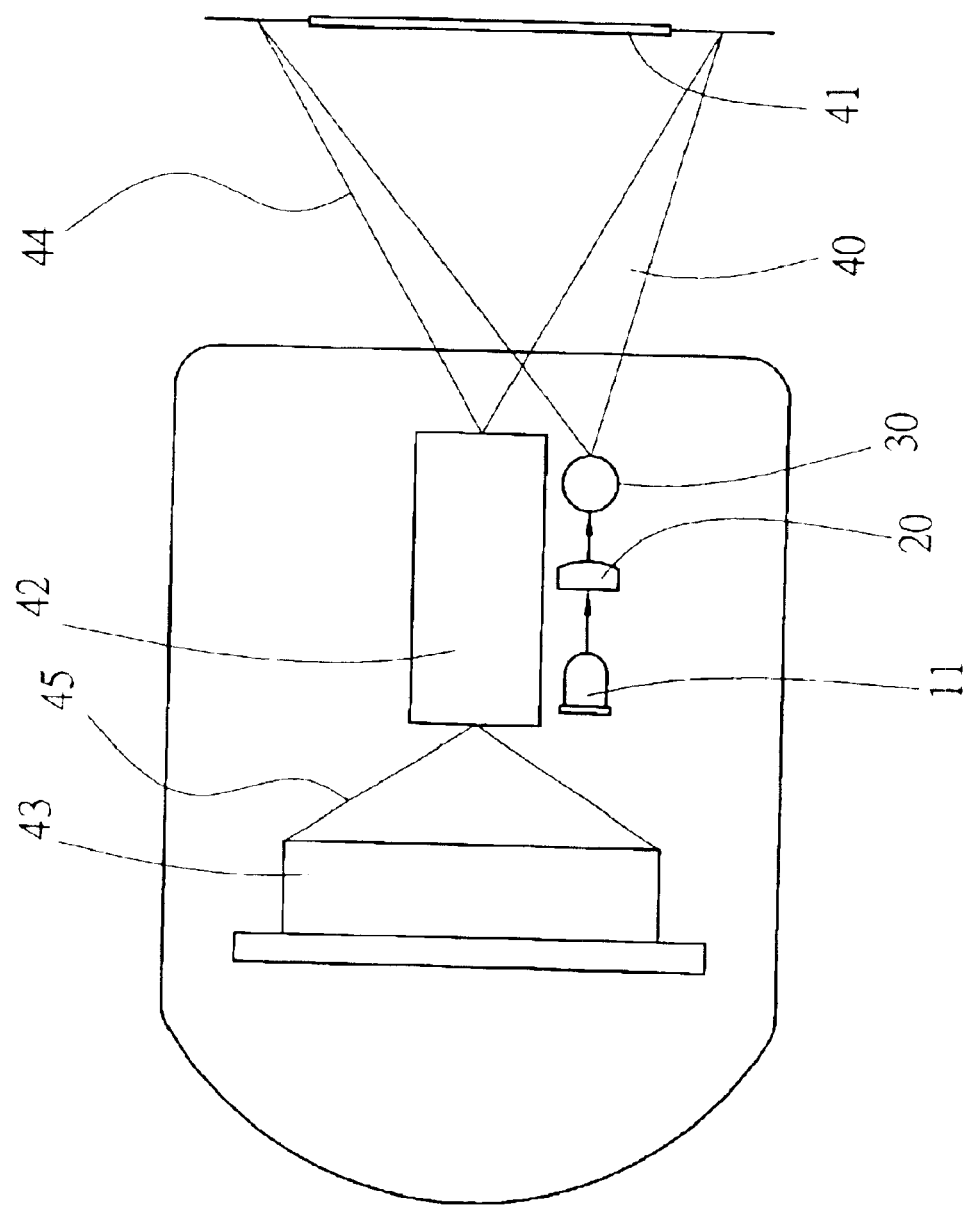
FIG. 3B is a schematic top view of another embodiment of the present invention.
Figure 4:
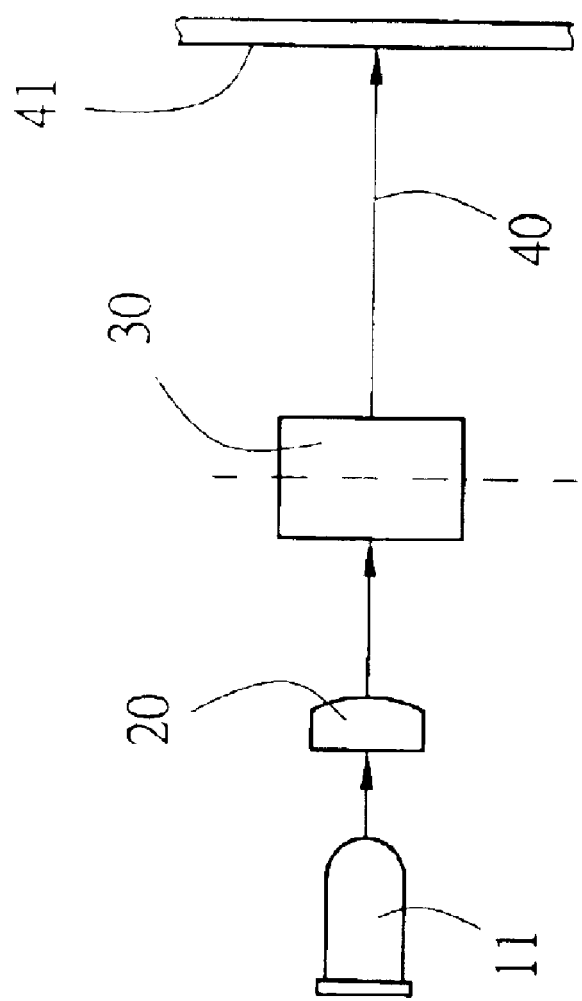
FIG. 4 is a side view of the present invention.

Referring to FIG. 1 and FIG. 4, the present invention applies a laser diode (11) as the point type light source. A collimating lens (20) is in front of the laser diode (11) to convert the point type expanding light beam into a point type parallel light beam. A standing cylindrical lens (30) is in front of the collimating lens (20) to inflect the point type light beam into a stripe type light beam. The standing cylindrical lens (30) can be a single standing cylindrical lens or different combinations of multiple standing cylindrical. The shape of the standing cylindrical lens (30) can be in cylindrical, conical or curved cylindrical shape as needed. The shape of a cross-section area of the standing cylindrical lens (30) which has a light beam passing through can be convex (positive) or concave (negative) and its curve part can be in whole or part of a circular, elliptic, or aspherical shape. The other areas of the standing cylindrical lens in which the light beam doesn't pass through can be in any other shape.

Referring to FIG. 1, FIG. 2A, FIG. 2B, FIG. 3A, FIG. 3B and FIG. 4. The point type expanding light beam emitted by the laser diode (11) passes through the collimating lens (20) as a point type parallel light beam, then propagates in a perpendicular direction to the standing cylindrical lens (30). The standing cylindrical lens (30) inflects the point type light beam into a stripe type light beam (40). The width of the stripe type light beam (40) is slightly wider than the width of the barcode (41) to cover the image of the barcode (41). The reflected image (44) returns to a condensing lens (42). The condensing light (45) then is focused to a linear light receiver (43). The linear light receiver (43) is a CMOS or a CCD sensor that converts the light signal into an electrical signal, which is decoded by a backend circuitry.

Figure 5:
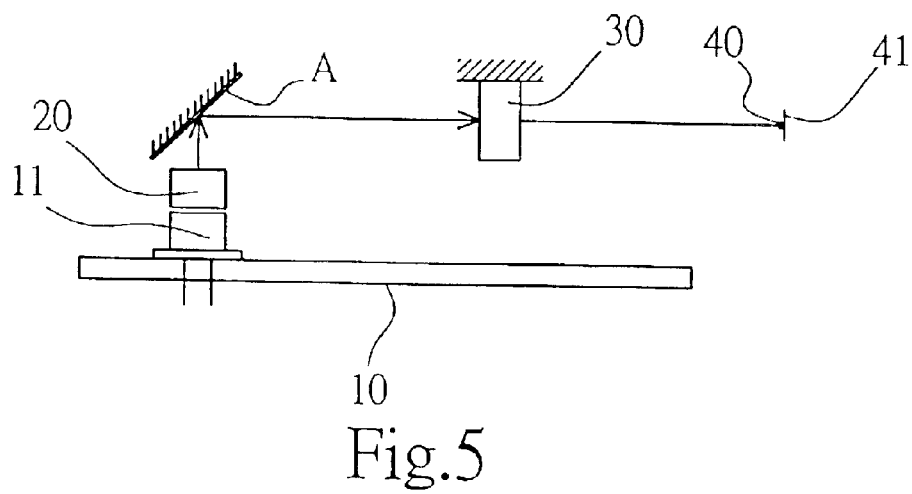
FIG. 5 is an assembling view of a mirror of the present invention.

In order to achieve the purpose of changing the propagation direction of the light beam, a special design as shown in FIG. 5 is provided. The light source of the barcode scanner is composed of a circuit board (10), with a laser diode (11) soldered vertically on. A collimating lens (20) is on top of the laser diode (11). A mirror (A) is on top of the collimating lens (20). A standing cylindrical lens (30) is in front of the mirror (A). The light beam is emitted from the laser diode (11) vertically with the circuit board (10) towards and passes through the collimating lens (20). The parallel light beam is reflected by the mirror (A) and is emitted horizontally to the standing cylindrical lens (30). Finally, a stripe type light beam (40) is formed and reaches to the barcode (41). The scheme can eliminate a secondary circuit board which has a laser diode soldered on it. This further can save the total cost and avoid the risk of a bad connection between the main and secondary circuit boards.

Figure 6:
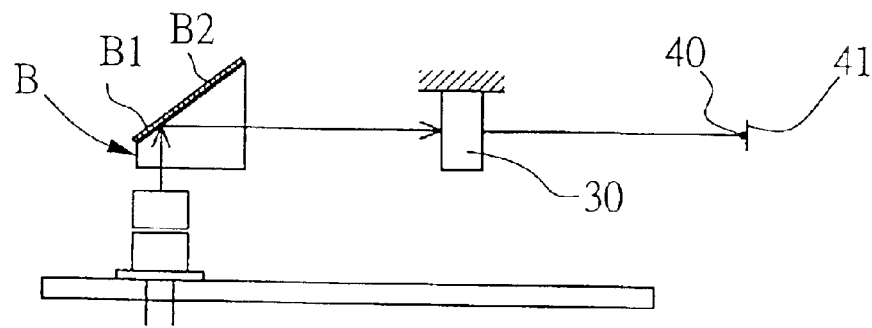
FIG. 6 is an assembling view of a prism of the present invention.

Referring to FIG. 6, the mirror (A) can be replaced by a prism (B). The prism (B) has a inclined plane (B1) in 45° (or other proper angle). A thin film coating (B2) is on the surface of the inclined plane (B1). The light beam will be reflected by the inclined plane (B1) and exits the prism horizontally. In this and the following applications, when the light beam enters (or leaves) different prisms, if the light beam enters and exits the prism (B) vertically with the "in" and "out" prism planes, the light beam can pass through the prism completely (no energy loss).

Figure 7:
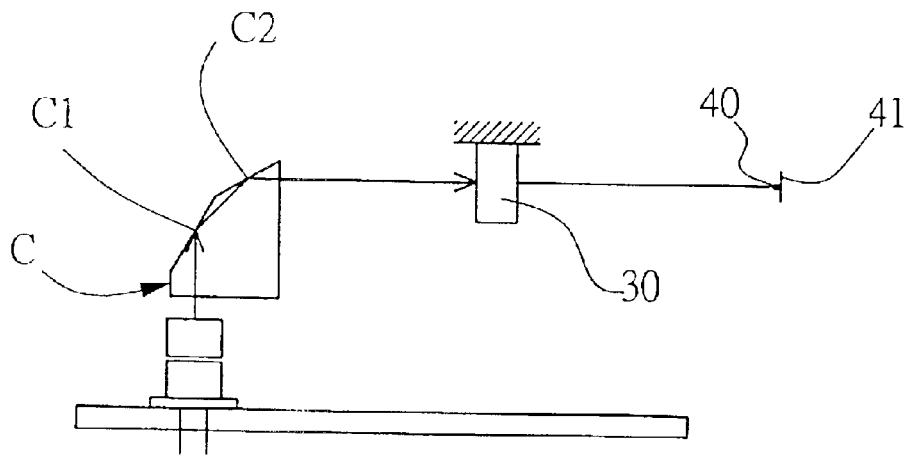
FIG. 7 is an assembling view of the second prism of the present invention.
Figure 8:
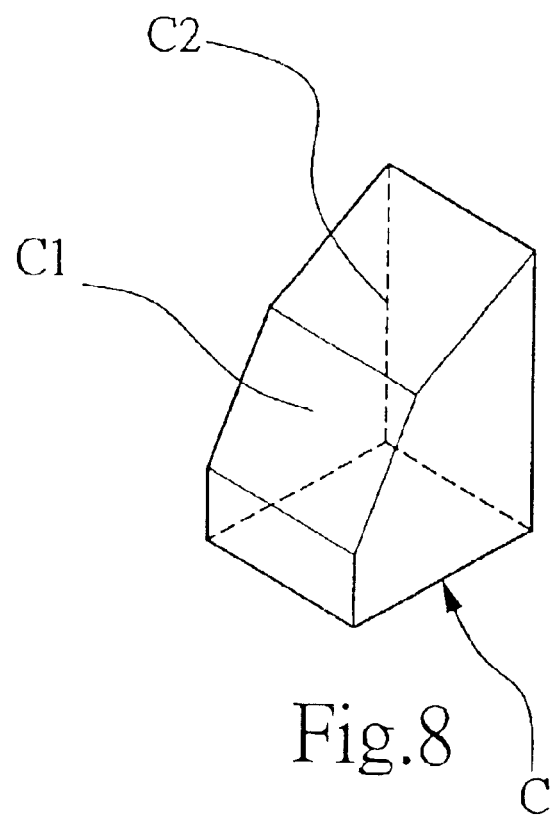
FIG. 8 is a perspective view of the second prism of the present invention.

Referring to FIG. 8, a different application of the prism (C) is shown. The prism (C) has two consecutive inclined planes (C1) and (C2) without a thin film coating. The is a total reflection rule, when the light beam is incident from a denser (greater index) medium to a rarer (lower index) medium, when the incident angle is larger than the total reflection angle (critical angle), the light beam can be reflected complete. Refer to FIG. 7. After the light beam passing through the collimating lens (20) and enters the prism (C), with the proper angles arrangement of the two consecutive inclined planes (C1) and (C2) without thin film coating, the light beam is reflected consecutive by the two consecutive inclined planes (C1) and (C2) and goes out of prism to the standing cylindrical lens (30), the direction of final propagation light beam is vertical with the direction of original incident light beam.

Figure 9:
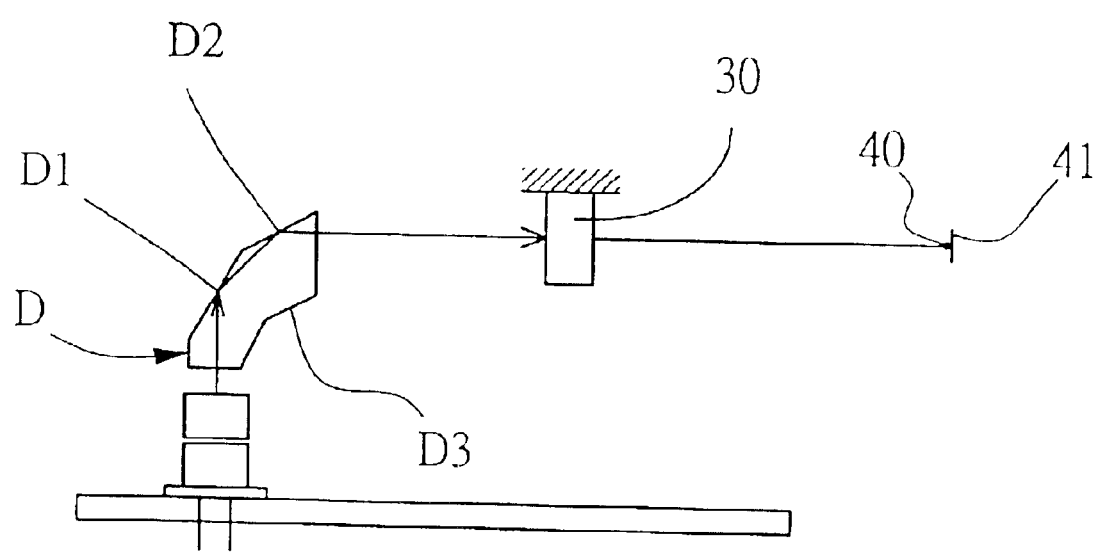
FIG. 9 is an assembling view of the third prism of the present invention.
Figure 10:
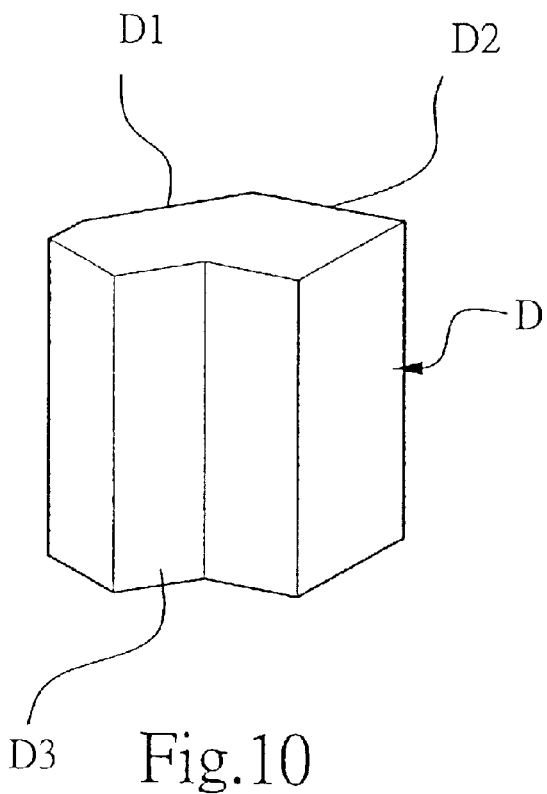
FIG. 10 is a perspective view of the third prism of the present invention.

Refer to FIG. 9 and FIG. 10. Another application of the prism (D) is shown in which the prism (D) not only has two consecutive inclined planes (D1) and (D2) without thin film coating but also has an inward design (short of one corner) (D3) on other side of prism. The location of the inward design (D3) is not on the light beam path inside prism when light beam is incident upon the prism (D) and the two consecutive inclined planes (D1) and (D2). The scheme can make the prism (D) more compact to reduce the weight and cost of prism.

Figure 11:
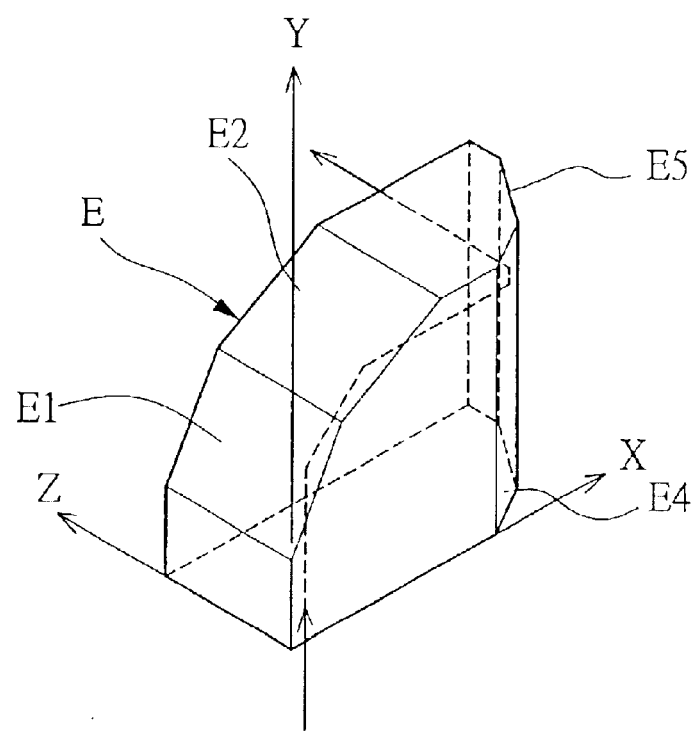
FIG. 11 is a perspective view of the fourth prism of the present invention.
Figure 12:
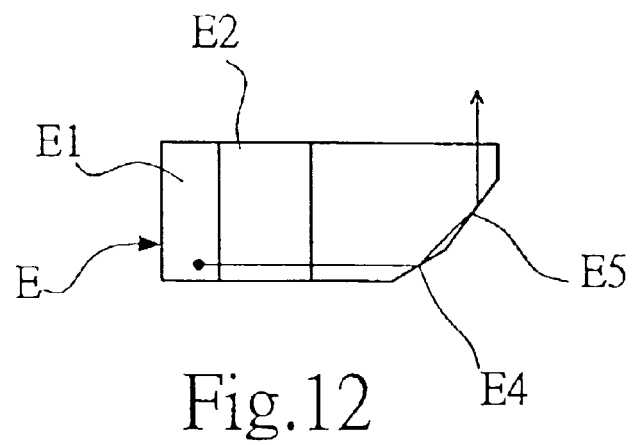
FIG. 12 is a top view of the fourth prism of the present invention.
Figure 13:
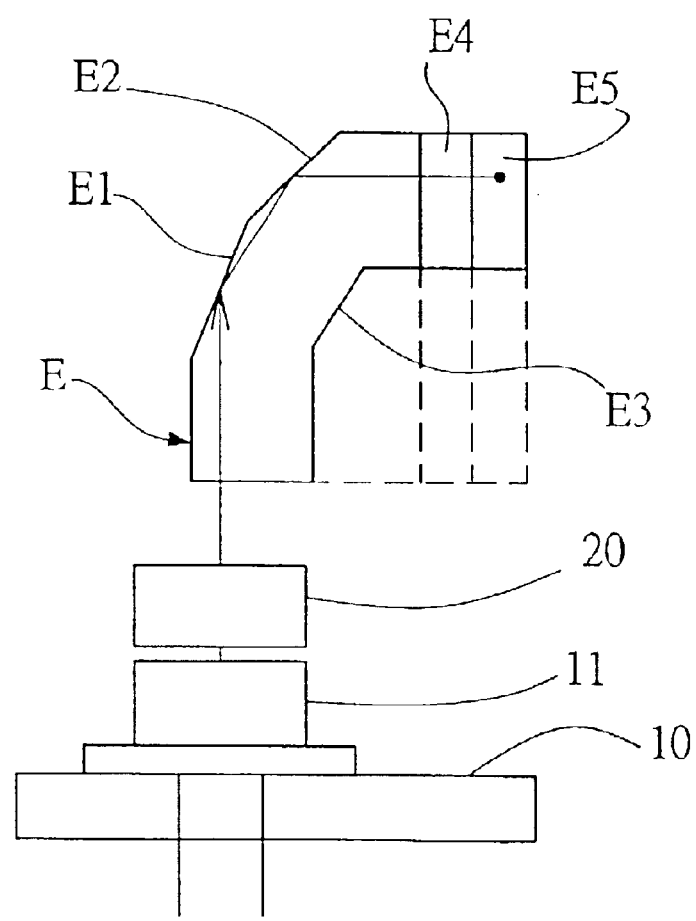
FIG. 13 is a schematic drawing of an embodiment of the fourth prism of the present invention.

Refer to FIG. 11 and FIG. 12, which show another application of the prism (E). The prism (E) not only has two consecutive inclined planes without coating (E1) and (E2) but also has another two consecutive inclined planes without coating (E4) and (E5) on the light beam propagation direction when light beam is reflected from the second inclined plane. The two consecutive inclined planes without coating (E4) and (E5) apply the same total reflection rule can change the light beam to another direction (Z-axis for example) to make the light beam direction changing more flexible. Refer to FIG. 13. An inward design (short of one corner) (E3) is on the prism (E). The inward design (E3) is not in the light beam path. The scheme also reduces the weight and cost of the prism.

Figure 14:
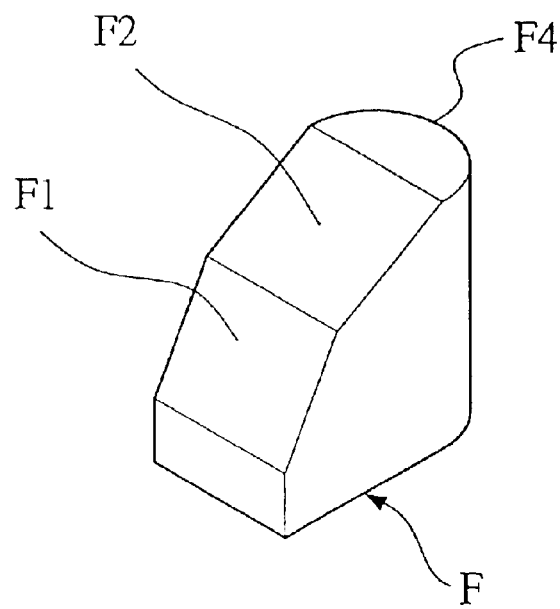
FIG. 14 is a perspective view of the fifth prism of the present invention.
Figure 15:
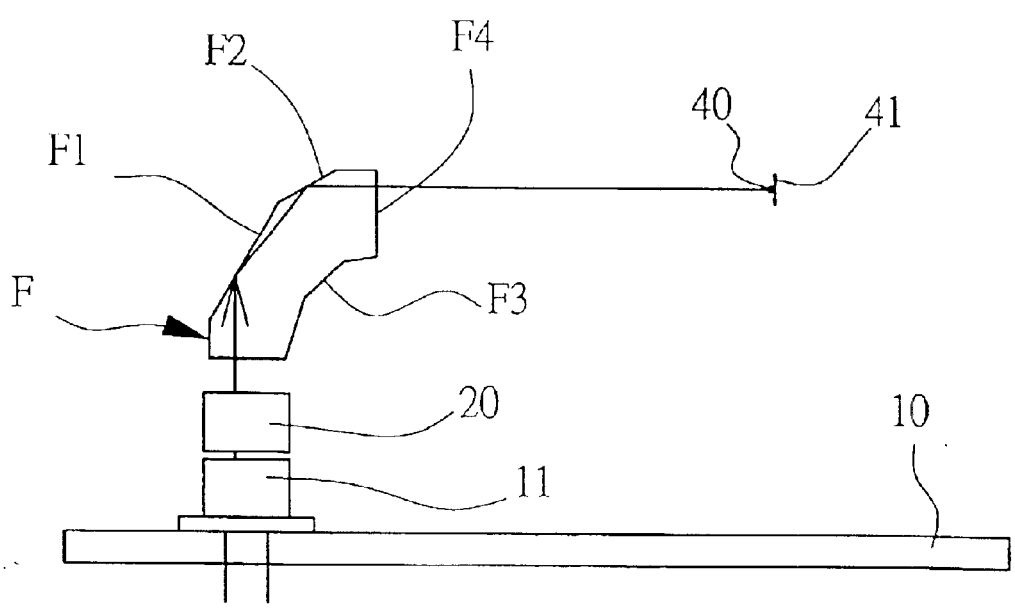
FIG. 15 is an assembling view of the fifth prism of the present invention.
Figure 16:
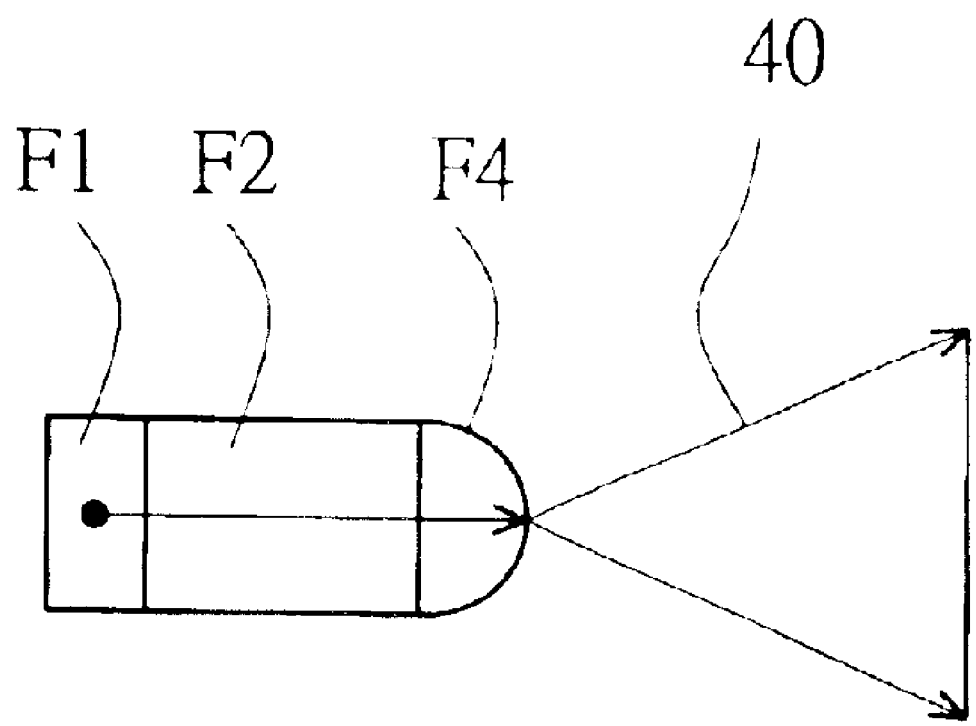
FIG. 16 is a top view of the fifth prism of the present invention.

Refer to FIG. 14 and FIG. 16. Another application of the prism (F) is shown. The prism (F) not only has two consecutive inclined planes (F1) and (F2) but also has an outward convex (or inward concave) cylindrical curved design (F4) on the light beam propagation direction when light beam is reflected from the second inclined plane (F2). The function of the outward convex (or inward concave) cylindrical curved design (F4) is the same as the standing cylindrical lens (30) shown in FIG. 5. The point type laser light beam passes the outward convex (or inward concave) cylindrical curved design (F4), and will be inflected into the stripe type light beam. This scheme has the benefit of few components and cost reduction. Refer to FIG. 15, which shows an inward design (short of one corner) (F3) on the prism (F). The inward design (F3) is not in the light beam path. This scheme also reduces the weight and cost.

While a preferred embodiment of the invention has been shown and described in detail, it will be readily understood and appreciated that numerous omissions, changes and additions may be made without departing from the spirit and scope of the invention.

What is claimed is:

1. A light source mechanism of a barcode scanner, comprising:

a laser diode that emits a point expanding light beam;

a collimating lens disposed in front of said laser diode to receive and convert the point expanding light beam from said laser diode into a point parallel light beam;

a standing cylindrical lens disposed in front of said collimating lens to receive and inflect the point parallel light beam from said collimating lens into a stripe light beam;

a condensing lens for condensing light;

a linear light receiver for receiving the light condensed by said condensing lens and converting the light into electrical signals; and a backend circuitry for decoding said the electrical signals;

wherein a prism or a mirror with a proper angle is disposed on top of said laser diode and said collimating lens, the light beam from said laser diode being vertically emitted with a circuit board, passing through said collimating lens and being reflected by said prism or mirror and finally being emitted horizontally to said standing cylindrical lens, the stripe light beam being formed to reach a barcode.

2. The light source mechanism of a barcode scanner recited in claim 1, wherein said prism has an inclined plane of 45°.

3. The light source mechanism of a barcode scanner recited in claim 2, wherein said prism has an inward design that is not in the light beam path.

4. The light source mechanism of a barcode scanner recited in claim 3, wherein at least one inclined plane is installed vertically to the inclined plane of said prism to cause the incident light beam to be reflected in a horizontal direction first and then reflected in a perpendicular direction.

5. The light source mechanism of a barcode scanner recited in claim 4, wherein an outward convex or inward concave cylindrical curved design is disposed in a light beam propagation direction to replace said standing cylindrical lens when the light beam is reflected from said second inclined plane without coating of said prism.

6. The light source mechanism of a barcode scanner recited in claim 4, wherein said inclined plane of said prism has a thin film coating to increase a reflecting effect.

7. The light source mechanism of a barcode scanner recited in claim 1, wherein said prism has two consecutive inclined planes without thin film coating, the incident light beam being reflected consecutively and going out in a vertical direction with the direction of the original incident light beam.

8. The light source mechanism of a barcode scanner recited in claim 7, wherein said prism has an inward design that is not in the light beam path.

9. The light source mechanism of a barcode scanner recited in claim 8, wherein at least one inclined plane is installed vertically to the inclined plane of said prism to cause the incident light beam to be reflected in a horizontal direction first and then reflected in a perpendicular direction.

10. The light source mechanism of a barcode scanner recited in claim 9, wherein an outward convex or inward concave cylindrical curved design is disposed in a light beam propagation direction to replace said standing cylindrical lens when the light beam is reflected from said second inclined plane without coating of said prism.

11. The light source mechanism of a barcode scanner recited in claim 9, wherein said inclined plane of said prism has a thin film coating to increase a reflecting effect.

* * * * *